United States Patent
Furuta

[15] 3,693,524
[45] Sept. 26, 1972

[54] SHUTTER SAFETY DEVICE IN A CAMERA PROVIDED WITH AN ELECTRIC SHUTTER

[72] Inventor: Koichi Furuta, Tokyo, Japan
[73] Assignee: Nippon Kogaku K.K., Tokyo, Japan
[22] Filed: Sept. 10, 1971
[21] Appl. No.: 179,486

[30] Foreign Application Priority Data

Sept. 19, 1970    Japan .................... 45/82118

[52] U.S. Cl. ............................. 95/31 EL, 95/53 E
[51] Int. Cl. .......................................... G03b 17/00
[58] Field of Search ....... 95/31 R, 31 EL, 53 E, 11 R, 95/10 C

[56] References Cited

UNITED STATES PATENTS

| | | |
|---|---|---|
| 3,550,513 | 12/1970 | Johnson et al. ............ 95/11 R |
| 3,425,327 | 2/1969 | Stuper et al. ............... 95/10 C |
| 3,367,251 | 2/1968 | Furuta ..................... 95/31 EL |

*Primary Examiner*—Samuel S. Matthews
*Assistant Examiner*—Russell E. Adams, Jr.
*Attorney*—Ward, McElhannon, Brooks & Fitzpatrick

[57] ABSTRACT

A safety device for an electric shutter in a camera is disclosed. The device is comprised of a wind-up lever which operates a power switch for turning the electric shutter on and off. The lever is movable through an angle of idle rotation between a retracted and extended position for respectfully turning the shutter off and on. The device also included a device for preventing actuation of the shutter release when the lever is in its retracted position to prevent photography when the electric shutter is off.

4 Claims, 4 Drawing Figures

SHUTTER SAFETY DEVICE IN A CAMERA PROVIDED WITH AN ELECTRIC SHUTTER

BACKGROUND OF THE INVENTION

1. Field of the Invention

This invention relates to safety device for an electric shutter assembled in a camera.

2. Description of the Prior Art

In cameras having an electric shutter, it is known to employ an electric control circuit including a capacitor or the like for controlling the shutter speed. A battery is used as the power source for such circuit, and in order to increase the service life of the battery, it is desirable that an electric current should flow only during the exposure measurement or photographing operation so as to allow the exposure measurement or the shutter action to be effected. For this purpose, it has already been proposed to provide a power switch. The electric shutter suffers from a problem in that when it is released with no current flowing in the control circuit, the release does not occur at a desired shutter speed or the shutter remains open. Also, as is well known, the shutter release button is provided with a safety device for preventing the button from being inadvertently depressed. However, it is imperative with such cameras that the power switch and the safety device of the shutter release button be operated individually and, as a result, the photographing operation might be time-consuming or the user might forget to operate either or both of the power switch and the safety device.

SUMMARY OF THE INVENTION

It is a general object of the present invention to eliminate the foregoing disadvantages by providing an operative association between the power switch for the shutter and the safety device for the shutter release button so that when the power switch is open any shutter release is prevented.

According to the present invention, there is provided a safety device for an electric shutter assembled in a camera which comprises a wind-up lever, means for retaining a shutter release button, a power switch and a signal member associated with the wind-up lever and displaceable in accordance with the extended and retracted positions of the wind-up lever lying within the angle of idle rotation thereof. The signal member is disposed between the shutter release button retaining means and the power switch so as to release the shutter release button retaining means from retaining position and close the power switch in response to movement of the wind-up lever to extended position and to bring the shutter release button retaining means into retaining position and open the power switch in response to movement of the wind-up lever to the retracted position.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompanying drawings, forming a part of the specification, wherein:

DESCRIPTION OF THE PREFERRED EMBODIMENT

Figure 1:
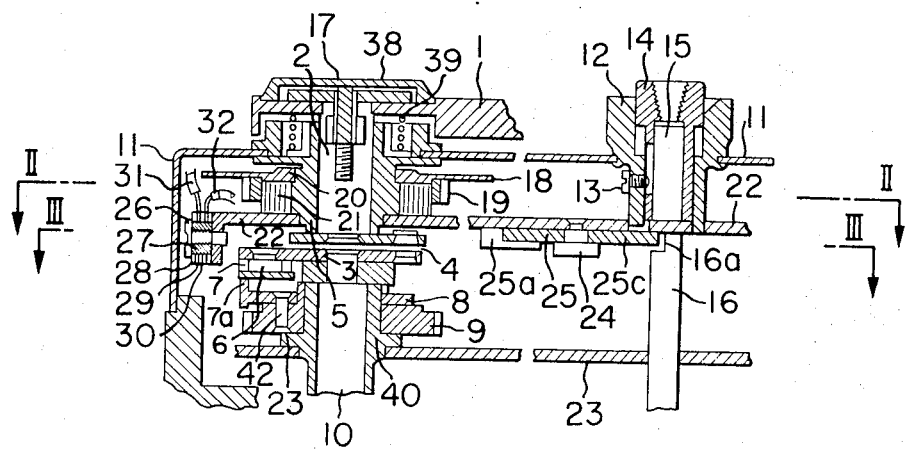
FIG. 1 is a partly broken-away, longitudinal sectional view of apparatus according to an embodiment of the present invention.
Figure 2:
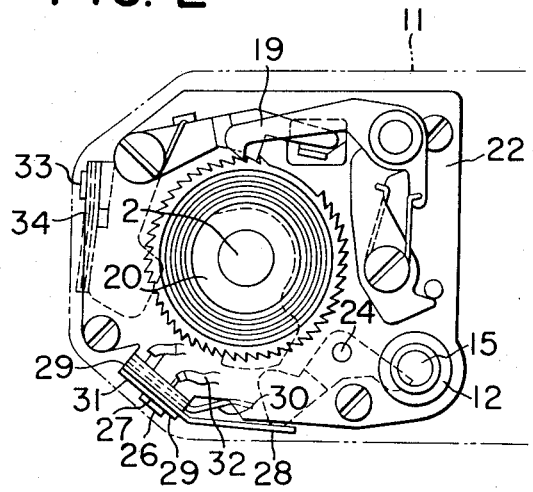
FIG. 2 is a plan view taken along lines II—II of FIG. 1.
Figure 3:
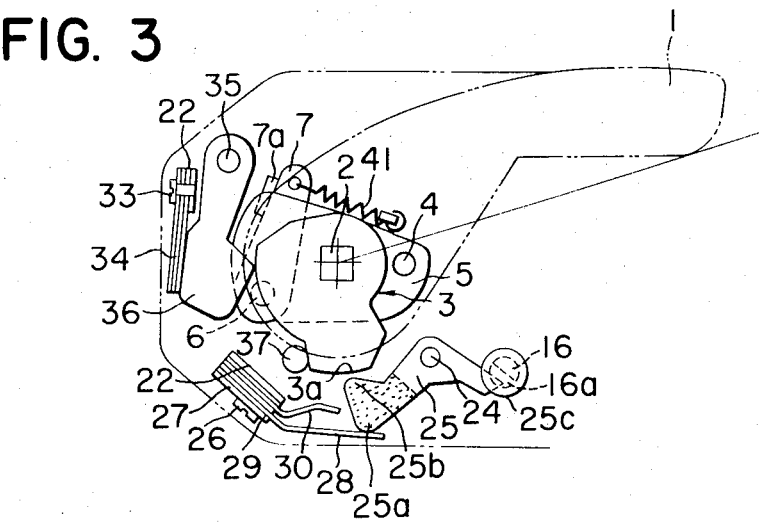
FIG. 3 is a plan view taken along lines III—III of FIG. 1 and showing the wind-up lever in its retracted position.

Referring to FIGS. 1 and 2, a wind-up lever 1 is secured to one end of a rotatable shaft 2, and a click cam plate 3 is secured to the shaft at the other end thereof so that the lever and cam plate rotate together. A supporting member 38 is also secured to the shaft 2 and overlies part of the lever 1. The lever 1, the shaft 2 and the cam plate 3 are urged in wind-up direction by a spring 39. A connecting pin 4 is studded on a feed pawl plate 5 at one end thereof and extends upwardly beyond the plane of the cam plate 3, the plate 5 being fixed on a wind-up shaft 10. The shaft 10 is rotatably mounted in a bearing 40 secured to a lower base plate 23, and is biased in the wind-up direction by means of a spring not shown. As shown in FIG. 3, a shaft 6 is studded on the feed pawl plate 5 opposite the connecting pin 4 thereon, and a feed pawl 7 is pivotally mounted on the shaft 6 and is urged in the film wind-up direction by means of a spring 41. The feed pawl 7 is formed with a tab or bent-down portion 7a to engage a three-blade cam 8 (FIG. 1) which is secured to a wind-up gear 9 by means of a screw 42, and the wind-up gear 9 is rotatably mounted on the bearing 40.

From the description thus far, it will be seen that rotation of the wind-up lever 1 causes the end face of the click cam plate 3 (FIG. 4) to push the connecting pin 4, so that the rotation of the wind-up lever is transmitted to feedpawl 7, three-blade cam 8 and wind-up gear 9 to thereby wind a film (not shown) or charge a shutter or, in case of a single lens reflex camera, a mirror mechanism (not shown), by means of wind-up shaft 10.

Figure 4:
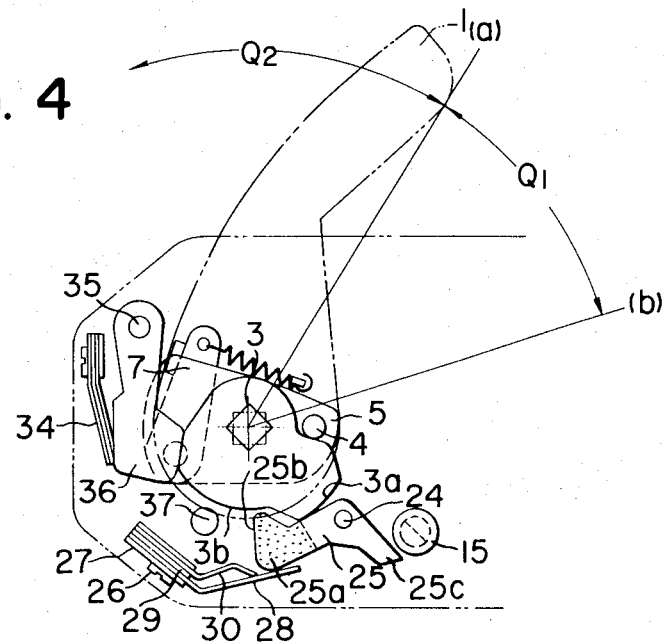
FIG. 4 is a view similar to FIG. 3 and showing the wind-up lever extended to a wind starting position.

The click cam plate 3 includes an extended portion 3a for engaging one end 25b of a switch lever 25 (to be described) between the retracted position and the extended position of the wind-up lever 1, and a reduced portion 3b for engaging the end 25b of the switch lever 25 in the extended position of the wind-up lever 1 (see FIGS. 3 and 4). A stop 37 for limiting the rotation of the click cam plate 3 to stop the wind-up lever 1 in its retracted position (FIG. 3) is studded on the upper base plate 22. Thus, the click cam plate 3 provides a signal member displaceable in accordance with the extended and retracted positions of the wind-up lever 1.

In a ferrule 12 secured to a shell 11, a shutter release button 14 is mounted against rotation but for axial movement, by means of a screw 13 and slot 13a. The shutter release button 14 accommodates therein an inner release button 15, which engages a release shaft 16 so that depression of the button 14 or 15 lowers the release shaft 16 to release the shutter.

The wind-up lever 1 is pivotally secured to the shaft 2 by means of a screw 17. There are further provided a frame counter dial 18, a ratchet 19, a wind-up lever bearing 20, a frame counter return spring 21 and upper and lower base plates 22 and 23, all in the known manner. The switch lever 25 is rotatably mounted on the upper base plate 22 by means of a switch lever shaft 24 (FIGS. 1, 3 and 4). One end 25a of the switch lever 25 has a insulating material attached thereto, and another end 25b of the switch lever 25 is adapted to be engaged by the extended portion 3a or the reduced portion 3b of the click cam plate 3. When the wind-up lever 1 is in its extended position, the switch lever 25 is rotated clockwise by a spring 28 so as to disengage still another end 25c thereof from a recess 16a formed in the release shaft 16 (FIG. 4); and when the wind-up lever 1 is in its retracted position, the switch lever 25 is rotated counter-clockwise by the click cam plate 3 so as to extend into the recess 16a (FIGS. 1 and 3). Thus, the switch lever 25 provides means for retaining the shutter release button.

Further, at a flanged end of the base plate 22, a switch plate spring 28 and a switch plate 30, which together constitute a switch portion operable in engagement with the switch lever 25, are mounted by means of a screw 26, with a switch keep plate 27 of insulating material interposed between the screw 26 and the switch plate spring 28 and with a switch insulating plate 29 interposed between the spring 28 and the plate 30. The switch plate spring 28, insulating plate 29 and switch plate 30 together provide a power switch. At the other end of the upper base plate 22, a click spring 34 is secured by means of a screw 33 so that a click lever 36 rotatably mounted on the upper base plate 22 by means of a click lever shaft 35 may be urged into contact with the click cam plate 3 (FIG. 3). The power switch is connected with an electric circuit (not shown) through lines 31 and 32 which are connected to the spring contact 28 and the plate 30, respectively.

According to the arrangement described above, when the wind-up lever 1 is in the position as indicated by line (b) in FIG. 4, that is, in the non-photographing position (FIGS. 1 and 3), the end 25b of the switch lever 25 is biased by the extended portion 3a of the click cam plate 3 against the force of the switch plate spring 28 so that the switch plate spring 28 is disengaged from the switch plate 30. Thus, the power switch is brought into OFF position. On the other hand, another end 25c of the switch lever 25 is received in the recess 16a of the shaft 16 so as to retain the release button 15 and accordingly the release shaft 16 against any inadvertent depression. Thus, the shutter cannot be released.

However, when the wind-up lever 1 is rotated counter-clockwise through an angle $Q_1$ to a position (a) or photographing position as shown in FIG. 4, the click cam 3 is also rotated counter-clockwise so that the switch lever 25 is rotated clockwise by the force of the plate spring 28 until that end 25b of the lever 25 which has previously engaged the extended portion 3a is opposed to the reduced portion 3b of the click cam 3. Thus, the plate spring 28 is now engaged with the switch plate 30. By that time, the end 25c of the switch lever 25 has been completely disengaged from the lower portion of the inner release button 15. Thus, the power switch is in ON position and the shutter release button 14 or the inner release button 15 is in a position for releasing the shutter.

The angle $Q_1$ is an angle of idle rotation of the wind-up lever 1 and the click cam 3 is contoured so that the switch plate spring 28 is engageable with the switch plate 30 for the full range of the angle of rotation $Q_2$ of the wind-up lever 1. Therefore, the user can reliably operate the camera simply by actuating the wind-up lever without paying any particular attention to the ON or Off position of the switch and to the operation of the safety device of the shutter release button. Also, one end of the click cam plate 3 is engaged by the click lever 36 so as to prevent the wind-up lever 1 from being inadvertently returned from its extended position to its retracted position.

Thus, according to the present invention, the power switch and the safety device of the shutter release button are operatively associated with the wind-up lever so that the former are actuated within the range of the angle of idle rotation of the latter, and this is useful to obviate the waste of the battery power and to prevent the shutter release when no current is flowing through the circuit. In addition, actuation of the wind-up lever is all that is necessary to operate the power switch and the safety device, and this leads to simple and quick photographing procedures free of any error in operation. Furthermore, the spring forming a part of the power switch also serves as a spring for the shutter button retaining lever and it contributes to the simplification of the construction.

I claim:

1. A safety device for an electric shutter incorporated in a camera, said device comprising:
    a wind-up lever shiftable between extended and retracted positions through an angle of idle rotation;
    means for retaining a shutter release button;
    a power switch; and
    signal means associated with said wind-up lever and displaceable
    in accordance with the extended and retracted positions of said wind-up lever lying within the angle of idle rotation thereof;
        said signal means being disposed to release said shutter release button retaining means from retaining position and close said power switch in response to the shifting of said wind-up lever to extended position, and to bring said shutter release button retaining means into retaining position and open said power switch in response to shifting of said wind-up lever to retracted position.

2. A safety device as defined in claim 1, wherein said means for retaining a shutter release button comprises a switch lever rotatably mounted on a base plate by means of a shaft.

3. A safety device as defined in claim 1, wherein said power switch comprises a switch plate spring, an insulating plate and a switch plate all mounted on a base plate by means of a screw.

4. A safety device as defined in claim 1, wherein said signal member comprises a click cam plate rotatable with said wind-up lever.

* * * * *